United States Patent [19]

Dore

[11] 3,948,879
[45] Apr. 6, 1976

[54] PHENYLAZONAPHTHOLSULFONIC ACIDS HAVING A SUBSTITUTED ANILINO GROUP IN THE 6-POSITION OF THE NAPHTHALANE RING

[75] Inventor: Jacky Dore, Basel, Switzerland

[73] Assignee: Sandoz Ltd., Basel, Switzerland

[22] Filed: July 11, 1973

[21] Appl. No.: 378,257

Related U.S. Application Data

[62] Division of Ser. No. 144,620, May 18, 1971, Pat. No. 3,782,897.

[30] Foreign Application Priority Data

June 2, 1970  Switzerland........................ 8228/70
Jan. 22, 1971  Switzerland........................... 985/71

[52] U.S. Cl............................... 260/198; 260/151
[51] Int. Cl.² ................. C09B 29/30; C09B 45/16
[58] Field of Search..................................... 260/198

[56] References Cited
UNITED STATES PATENTS

| 2,076,484 | 4/1937 | Senn................................... 260/198 |
| 2,120,432 | 6/1938 | Zervas et al....................... 260/198 |
| 2,140,763 | 12/1938 | Raeck et al........................ 260/198 |
| 3,516,979 | 6/1970 | Dore et al........................ 260/198 X |

FOREIGN PATENTS OR APPLICATIONS 220,392  12/1905  Germany............................ 260/198

Primary Examiner—Charles F. Warren
Attorney, Agent, or Firm—Gerald D. Sharkin; Richard E. Vila; Melvyn M. Kassenoff

[57] ABSTRACT

Compounds of the formula

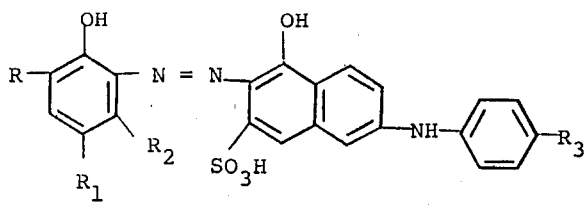

(I), wherein
 each of R and $R_1$ independently is halo,
 $R_2$ is hydrogen or halo,
 $R_3$ is halo or —$OR_4$, and
 $R_4$ is alkyl or substituted alkyl,
and chromium complexes thereof. The monoazo compounds are particularly useful for dyeing natural and synthetic polyamide fibers by producing a chromium complex thereof on the fiber by treating the fiber with 2 moles of the monoazo compound and simultaneously or subsequently treating the fiber with 1 to 2 moles of a chromium-donating compound.

3 Claims, No Drawings

PHENYLAZONAPHTHOLSULFONIC ACIDS HAVING A SUBSTITUTED ANILINO GROUP IN THE 6-POSITION OF THE NAPHTHALANE RING

This application is a division of Ser. No. 144,620, filed on May 18, 1971 and now U.S. Pat. No. 3,782,897.

This invention relates to a process for dyeing natural and synthetic polyamide fibers with monoazo compounds wherein a complex of chromium and a monoazo compound of the formula

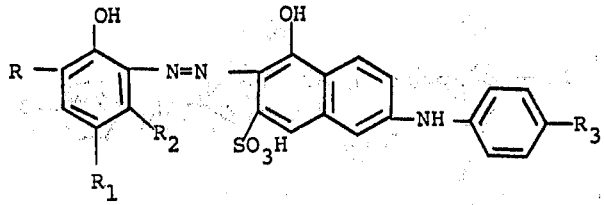

(I), wherein
each of R and $R_1$ is independently halo,
$R_2$ is hydrogen or halo,
$R_3$ is halo or —$OR_4$, and
$R_4$ is an alkyl radical which may be substituted,
is obtained on the fiber by treatment of the fiber with 2 moles of the monoazo compound and 1 to 2 moles of a chromium-donating compound.

Good dyeings are obtained using a monoazo compound of the formula

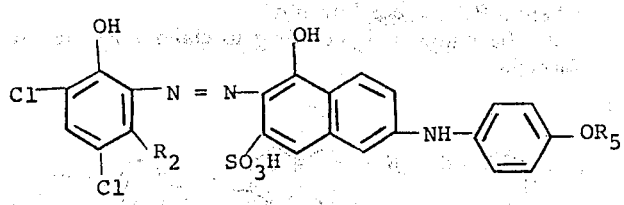

wherein $R_5$ is lower alkyl.

Compound 5 of Formula I can be obtained by diazotizing an aniline of the formula

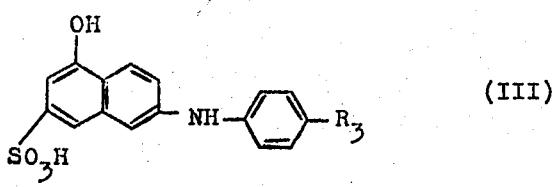

and coupling the resulting diazo compound with a coupling component of the formula

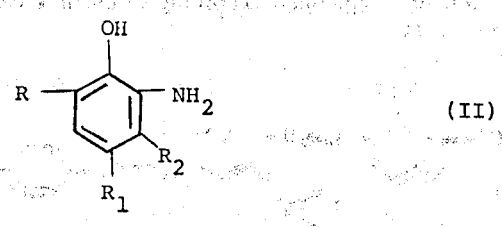

The coupling reaction can be carried out in an aqueous neutral to alkaline medium, preferably at pH 10.0 to 11.0, and at temperatures of —10°C to 60°C, preferably 0°–20°C, if necessary in the presence of coupling accelerants.

In each instance halogen represents a bromine, fluorine or iodine, or more especially a chlorine atom.

The alkyl radicals are generally lower alkyl radicals having 1 to 4 carbon atoms. If they are substituted they usually contain halogen atoms, cyano, hydroxy or amino groups or an aryl radical such as a phenyl radical. In such cases "alkyl" stands for an aralkyl, e.g., a benzyl, radical.

Chromic fluoride, chromic sulphate, chromic formate, chromic acetate, chromic potassium sulphate and chromic ammonium sulfate exemplify suitable chromium-donating compounds. The chromates too, e.g., sodium and potassium chromate and bichromate, are highly suitable for the metallization of the said monoazo compounds.

The principal natural polyamides are wool and silk. The synthetic polyamides include types of different chemical constitution, as named in SVF-Fachorgan 15, p. 8–9 (1960); examples are the products produced by condensation of a dibasic acid such as adipic acid and hexamethylene diamine (nylon 6.6), of caprolactam (nylon 6) and of aminoundecanoic acid (nylon 11).

Any of the known dyeing methods can be employed.

(IV),

Thus the polyamide fibre can be dyed with a compound of Formula I and simultaneously treated with a chromium donating agent in the same bath, or the compound of Formula I can be applied first and metallized on the fibre with the chromium donor, either in the dyebath or in a fresh bath.

It is best to carry out the process in an aqueous acid medium at temperatures up to 100°C with the addition of an organic acid such as acetic acid or formic acid and in the presence of sodium sulphate or ammonium sulphate.

The navy blue dyeings obtained have good fastness to light and wet treatments such as washing, sea water, water, perspiration, milling and potting, along with good carbonizing and rubbing fastness.

In relation to polyamide dyeings produced with the nearest comparable known dyes in German Pat. No. 220,392, Example 3, dyeings on polyamide fibres produced by the present process have better fastness to wet treatments, notably alkaline perspiration fastness.

Further, it is surprising that polyamide fibres dyed by the process of this invention have better fastness properties, such as fastness to potting, than the dyeings given by monoazo compounds of Formula I which have been metallized with a chromium donor in substance. The dyeings are also of more brilliant shade.

In the following Examples the parts and percentages are by weight and the temperatures in degrees centigrade.

EXAMPLE 1

0.7 Parts of the dye of the formula

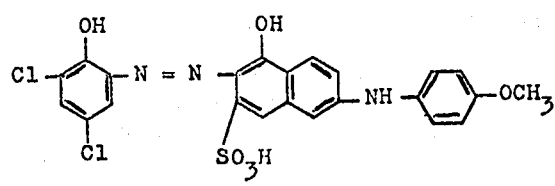

are dissolved in 6000 pats of water at 40°–50°. To this solution are added 5 parts of sodium sulphate, 2 parts of glacial acetic acid and 2 parts of 85 % formic acid. 100 Parts of wool gaberdine are entered into this dyebath and the temperature is then increased to the boil in 45 minutes, dyeing being continued at this temperature for 30 minutes. After this time a further 2 parts of 55 % formic acid are added and dyeing is continued for 30 minutes at the boil. The bath is then cooled to 70°, set with 0.75 parts of potassium bichromate and raised to the boil again. The fabric is treated for 30 minutes and on removal is treated further under the normal conditions. A navy blue dyeing is obtained on the wool gaberdine which has good light and wet fastness properties.

EXAMPLE 2

A dyebath is prepared by dissolving 1.5 parts of the dye of Example 1, 10 parts of sodium sulphate, 5 parts of ammonium sulphate and 1.5 parts of potassium bichromate in 6000 parts of water. 100 Parts of wool gaberdine are entered into the bath at 40°, the bath is brought to the boil in 60 minutes and the fabric dyed for 1 hour 30 minutes at this temperature. It is then treated further by the normal method. A navy blue dyeing of the same quality as that of Example 1 is obtained.

The dye specified in Example 1 can be produced as given in French Pat. No. 1,486,227 by coupling the diazo compound of 1-hydroxy-2-amino-4,6-dichlorobenzene with 2-(4'-methoxyphenylamino)-5-hydroxynaphthalene-7-sulphonic acid.

Comparably good dyeings on natural and synthetic polyamide fibres are obtained when the navy blue dye of the formula

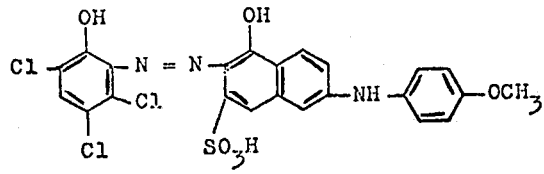

is applied by the procedures of Examples 1 or 2.

The dyes of the following formulae, which also give dyeings of navy blue shade, can be produced in the same manner:

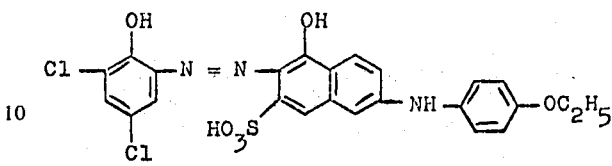

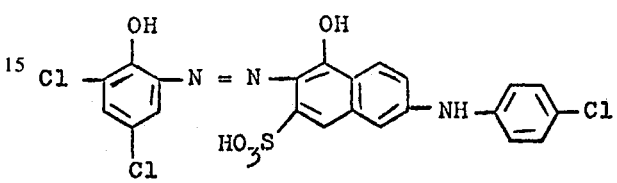

What I claim is:

1. A compound of the formula

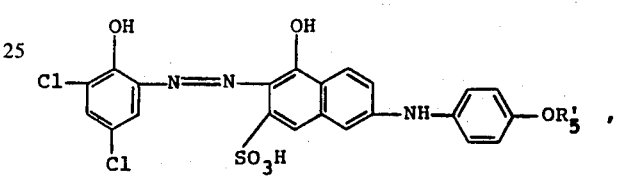

wherein $R_5'$ is methyl or ethyl.

2. The compound according to claim 1 having the formula

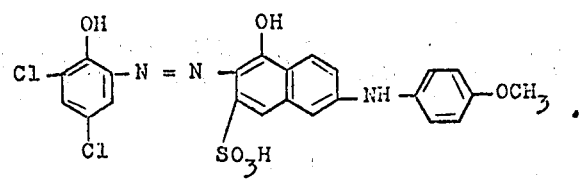

3. The compound according to claim 1 having the formula

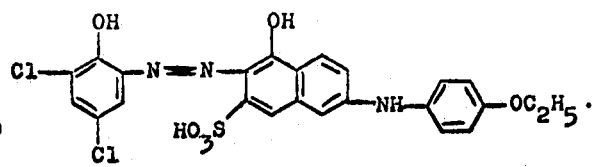

* * * * *